United States Patent

Ootsuka et al.

Patent Number: 5,129,659
Date of Patent: Jul. 14, 1992

[54] SHAFT SEAL FOR SLURRY PUMPS

[75] Inventors: Junji Ootsuka; Youichi Ogata; Keizaburo Nishi, all of Sakado, Japan

[73] Assignee: Eagle Industry Co., Ltd., Japan

[21] Appl. No.: 633,308

[22] Filed: Dec. 24, 1990

[30] Foreign Application Priority Data

Dec. 25, 1989 [JP] Japan ............... 1-148838[U]

[51] Int. Cl.⁵ .............................. F16J 15/16
[52] U.S. Cl. ............................ 277/92; 277/82; 277/133; 277/237 A
[58] Field of Search ........ 277/92, 82, 237 A, DIG. 4, 277/70, 67, 133, 74, 96.1, 134

[56] References Cited

U.S. PATENT DOCUMENTS

| 1,999,662 | 4/1935 | Nell | 277/133 |
| 2,036,453 | 4/1936 | Bary | 277/133 |
| 3,656,820 | 4/1972 | Pensa | 277/92 |
| 3,861,765 | 1/1975 | Follert et al. | 277/92 |

FOREIGN PATENT DOCUMENTS

| 3141512 | 5/1983 | Fed. Rep. of Germany | 277/92 |
| 1051131 | 12/1966 | United Kingdom | 277/92 |

Primary Examiner—William A. Cuchlinski, Jr.
Assistant Examiner—Daniel G. DePumpo

[57] ABSTRACT

A shaft seal for slurry pumps is provided, wherein a dust lip is attached to the outer periphery of a rotary seal ring such that it extends from its one end positioned in a confining space over a packing for the rotary seal and terminates at its other end in front of a seal cover for the packing with a slight gap between them, thereby avoiding erosion of the packing by slurry and instabilization of the loads applied to the sliding surface of the seal rings by erosion of the dust lip.

1 Claim, 1 Drawing Sheet

SHAFT SEAL FOR SLURRY PUMPS

BACKGROUND OF THE INVENTION

1. Field of the Invention

The present invention is concerned with an improvement in or relating to a slurry seal designed to seal up a fluid containing much slurry.

2. Prior Art

Heretofore, a prior art slurry pump used for pumping up muddy water or the like has been provided as a shaft sealing means with such a slurry seal as illustrated in FIG. 2.

More specifically, the illustrated slurry seal is designed such that a stationary seal ring 103 fixed through a packing 102 over a flange 101 located on the side of a pump casing and a rotary seal ring 108 held through a packing 107 over a seal cover 106 fixed to an end of a sleeve 105 mounted over a shaft 104 are brought into closely sliding contact with each other on their axially opposite sliding surfaces 103a and 108a, thereby preventing leakage of a fluid sealed up in a certain space S leading to the impeller side, not illustrated, from around the shaft.

The flange 101 is provided with a quenching hole 109 communicating with the side of the packing 102 attached over the stationary seal ring 103, which is opposite to the space S. Between the inner faces of both seal rings 103 and 108 and the outer face of the sleeve 105 mounted over the shaft 104, there is a baffle sleeve 110 fixed at one end to the inner end of the flange 101 and having the other end terminating at a position located in the rear of the rotary seal ring 108. Quenching water, supplied through the quenching hole 109 to the side 113 of the packing 102 which is opposite to the space S, flows through a gap 111 between the baffle sleeve 110 and both rings 103 and 108 toward the seal cover 106, whence it is discharged into the atmosphere A through a gap 112 between the baffle sleeve 110 and the sleeve 105.

A problem with the above-mentioned shaft seal, however, is that as the packing 107 for the rotary seal ring 108 rotates with said seal ring 108 and seal cover 106 and moves relative to the fluid contained in the space S and coming into contact with its surface, it is prone to erode vigorously by slurries of earth and sand, dust coal or the like contained in large amounts in the fluid. The packing 107 also serves as a spring to an axial movement of the rotary seal ring 6 by a reactionary force of compression, applying the pressure required for sealing-up to the sliding surfaces 103a and 108a. However, as such erosion by slurries as mentioned above proceeds, some adverse influence is produced on the loads applied to the sliding surfaces 103a and 108b with a fear of causing a premature drop in performance of the shaft seal.

In view of the foregoing, the present invention seeks to prevent premature erosion by slurry of the packing located around the rotary seal ring.

SUMMARY OF THE INVENTION

According to this invention, this object is achieved by the provision of a shaft seal for slurry pumps including a stationary seal ring fitted through a packing, which also serves as a spring means, over a flange located on the side of a casing and a rotary seal ring fitted through a packing, which also serves as a spring means, over a seal cover fixed to a sleeve of a shaft, said seal rings being in closely sliding contact with each other on their axially opposite sliding surfaces, wherein said rotary seal ring is provided on its outer periphery with a dust lip which extends from its one end positioned in a space, in which a fluid is confined, over the packing for said rotary seal ring and terminates at its other end in front of said seal cover with a slight gap between them.

With the above-mentioned arrangement wherein the dust lip is attached to the outer periphery of the rotary seal ring such that it extends from its end located within the space over the packing positioned between the rotary seal ring and the seal cover, the slurries contained in the fluid confined in the space is substantially unlikely to penetrate into a space in front of that packing. Even when the slurries penetrates into the space in front of the packing through the slight gap between the end of the dust lip and the front face of the seal cover, slurries rotate with the seal ring, packing, seal cover and thus dust lip, not moving relative to the packing and so causing no erosion of the packing. In addition, the presence of the slight gap between the end of the dust lip and the front face of the seal cover assures that the resilience of the dust lip causes no unstable variation in the loads applied to the sliding surface of both the seal rings.

BRIEF DESCRIPTION OF THE DRAWINGS

The present invention will now be explained specifically but not exclusively with reference to the accompanying drawings, in which.

DETAILED EXPLANATION OF THE EMBODIMENT

The present invention will now be explained in greater detail with reference to its one embodiment.

Figure 1:
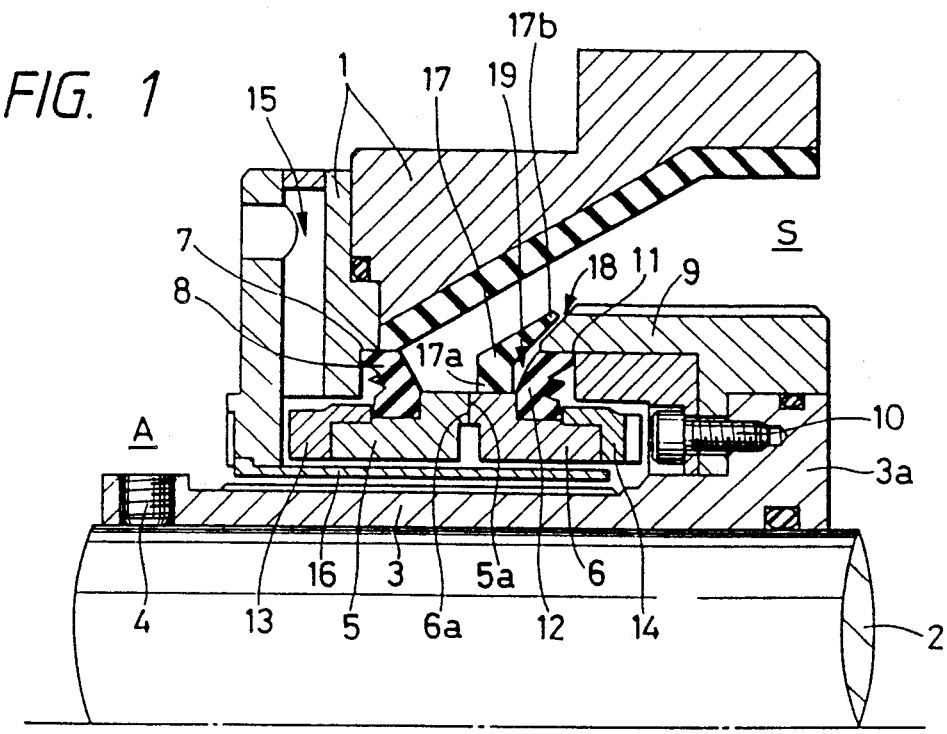
FIG. 1 is a partly sectioned view of one embodiment of the shaft seal according to this invention.
Figure 2:
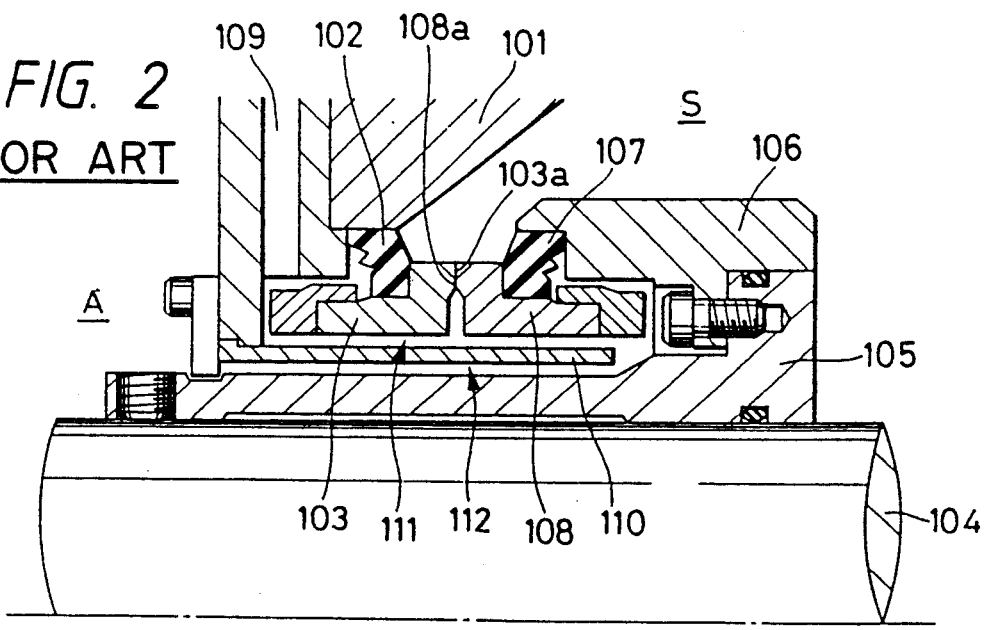
FIG. 2 is a partly sectioned view of a prior art structure.

Referring first to FIG. 1, a flange 1 is fixedly placed in a pump casing (not shown), a shaft 2 is inserted through the flange 1 to rotate an impeller which, although not shown, is attached to the right end of the apparatus according to this invention, and a sleeve 3 is hermetically inserted over the shaft 2 by means of a set screw 4.

The shaft seal is provided between the flange 1 and the shaft 2 to prevent leakage of a slurry-containing fluid from a space S confined within the pump casing along the shaft 2 to the atmosphere A, and includes a stationary seal ring 5 made of silicon carbide (SiC) having an increased wear resistance and a rotary seal ring 6 again made of silicon carbide, which comes into sliding contact in axial opposite direction with said seal ring 5, defining sliding surfaces 5a and 6a.

The flange 1 is provided on a part of its inside facing the space S with an annular step 7, on which the stationary seal ring 5 is resiliently supported from the outside through an elastomer packing 8. A seal cover 9 is hermetically fitted over, and bolted at 10 to, a collar-like end 3a, located within the apparatus, of the sleeve 3 attached over the shaft 2. The seal cover 9 is provided at its end axially opposite to the flange 1 with an annular step 11 corresponding to the aforesaid annular step 7. The rotary seal ring 6 is engaged with this annular step 11 through a packing 12 similar to the packing 8, and is resiliently supported thereon from the outside.

Metallic retainers 13 and 14 are fitted over the respective rear ends (opposite to the sliding surfaces 5a and 6a)

of both the seal rings 5 and 6, and are peripherally engaged with pins (not shown) axially extending through the flange 1 and seal cover 9, respectively, thereby keeping the stationary seal ring 5 stationary and transmitting a rotational force from the shaft 2 to the rotary seal ring 6 to rotate it.

The packings 8 and 12 serve to maintain airtightness between the flange 1 and the stationary seal ring 5 and between the seal cover 9 and the rotary seal ring 6 and, at the same time, serve as a spring means for bringing both seal rings 5 and 6 into pressure contact with each other with their elasticity, thereby applying the pressure required for sealing-up to the sliding surfaces 5a and 6a.

It is noted that reference numeral 15 stands for a quenching hole formed through the flange 1, and 16 a baffle sleeve for providing a flow passage for guiding quenching water from the quenching hole 15 into spaces defined within the seal rings 5 and 6.

A dust lip 17 made of a rubber material has one end 17a bonded or baked to a part of the outside of the rotary seal ring 6, which is located from the packing 12 to the space S. This dust lip 17 extends over the packing 12 from its the above-mentioned end located within the space S and has its other end 17b terminated in front of the seal cover 9 with a slight gap 18 between them.

By providing the dust lip 17 in this manner, the slurries contained in the fluid confined in the space S is unlikely to penetrate into a space 19 located in front of the packing 12 positioned between the rotary seal ring 6 and the seal cover 9. In this regard, it is understood that it is impossible to prevent penetration of the slurries into the space 19 completely due to the presence of the slight gap 18 between the end 17b of the dust lip 17 and the front face of the seal cover 9. Within the space 19, however, the incoming slurries are rotated with the rotary seal ring 6, packing 12, seal cover 9 and dust lip 17, all revolving in unison with each other. Thus, they are unlikely to move relative to the packing 12, which also serves as a spring means for the rotary seal ring 6, thereby causing erosion of said packing 12. This in turn renders it possible to avoid a drop in the pressures of the sliding surfaces 5a and 6a of both the seal rings 5 and 6 and its attendant leakage of the fluid.

It is noted that the dust lip 17 itself may erode by its relative movement with the slurries coming into contact with its outside. Owing to the presence of the slight gap 18 between the end 17b of the dust lip 17 and the front face of the seal cover 9, however, the resiliency of the dust lip 17 is unlikely to exert any spring action to apply an axial load to the rotary seal ring 6. Nor does a change in the resiliency of the dust lip 17 by erosion result in a change in the sealing pressures of the sliding surfaces 5a and 6a.

According to the shaft seal according to this invention as described above, wherein the dust lip is attached to the outer periphery of the rotary seal ring, the slurries are substantially unlikely to penetrate into the space in front of the packing between the rotary seal ring and the seal cover. The slurries, in any, are unlikely to move relative to the packing, thus avoiding erosion of the packing by the slurry. In addition, any change in the resiliency of the dust lip itself by erosion, if any, will cause no unstable variation in the loads of the sliding surfaces of both the seal rings. Thus, it is possible to maintain an improved sealability over an extended period.

What is claimed is:

1. A mechanical seal apparatus for a slurry pump comprising:
    a rotatable shaft;
    a non-rotating sealing ring disposed about said shaft;
    a non-rotating annular flange disposed about said shaft and said non-rotating sealing ring;
    a first annular elastic packing member positioned in sealing relationship between said non-rotating flange and said sealing ring;
    a rotatable sealing ring axially spaced from said non-rotating sealing ring along the axis of said rotatable shaft and disposed about said shaft;
    an annular sleeve in sealing relationship with said shaft;
    a seal cover fixed to and extending laterally from said annular sleeve;
    a second annular elastic packing member positioned in sealing relationship between said seal cover and said rotatable sealing ring;
    said non-rotating and rotatable sealing rings having opposed sealing surfaces generally perpendicular to the axis of said shaft and in contact with each other to form a seal therebetween;
    an annular skirt member attached at one end to said rotatable sealing ring, with said annular flange member being spaced from but coextensive with said second annular elastic packing member, and the outer extent of said annular flange terminating adjacent to and spaced from said seal cover.

* * * * *